United States Patent [19]

Trett

[11] Patent Number: 5,053,616

[45] Date of Patent: Oct. 1, 1991

[54] PHOTOELECTRIC ARRAY DETECTION CIRCUITRY WITH DUAL GATING MEANS

[75] Inventor: John Trett, Marlow, United Kingdom

[73] Assignee: Formula Systems Limited, Oxford, United Kingdom

[21] Appl. No.: 460,900

[22] PCT Filed: Apr. 17, 1989

[86] PCT No.: PCT/GB89/00400

§ 371 Date: Feb. 9, 1990

§ 102(e) Date: Feb. 9, 1990

[87] PCT Pub. No.: WO90/01773

PCT Pub. Date: Feb. 8, 1990

[30] Foreign Application Priority Data

Jul. 26, 1988 [GB] United Kingdom ............... 8817759

[51] Int. Cl.[5] .................................... G01V 9/04
[52] U.S. Cl. .................... 250/221; 250/222.1; 340/555
[58] Field of Search .............. 250/221, 222.1, 208.2, 250/214 B; 340/555, 556, 557

[56] References Cited

U.S. PATENT DOCUMENTS

| 4,260,882 | 4/1987 | Barnes | 250/205 |
| 4,309,696 | 1/1982 | Nagai et al. | 340/555 |
| 4,434,363 | 2/1984 | Yorifuji et al. | 250/214 B |
| 4,910,464 | 3/1990 | Trett et al. | 250/221 |

FOREIGN PATENT DOCUMENTS

| 509436 | 5/1980 | Australia . | |
| 2538275 | 10/1976 | Fed. Rep. of Germany . | |
| WO82102787 | 8/1982 | PCT Int'l Appl. | 250/221 |
| 1524564 | 9/1978 | United Kingdom . | |

Primary Examiner—David C. Nelms
Assistant Examiner—Que T. Le
Attorney, Agent, or Firm—Christie, Parker & Hale

[57] ABSTRACT

Detection circuitry in which the range and signal to noise ratios are improved includes a plurality of light emitting diodes connected in series and a plurality of photodiodes. Each photodiode has its own separate detection circuit which is AC decoupled by capacitors. Summing circuitry is connected to sum the outputs of the detection circuits and the resultant signal is fed to an output device. The magnitude of the output signal is increased by a factor equal to the product of the number of light emitting diodes and the number of photodiodes, over the situation where only one diode of each type is used.

12 Claims, 1 Drawing Sheet

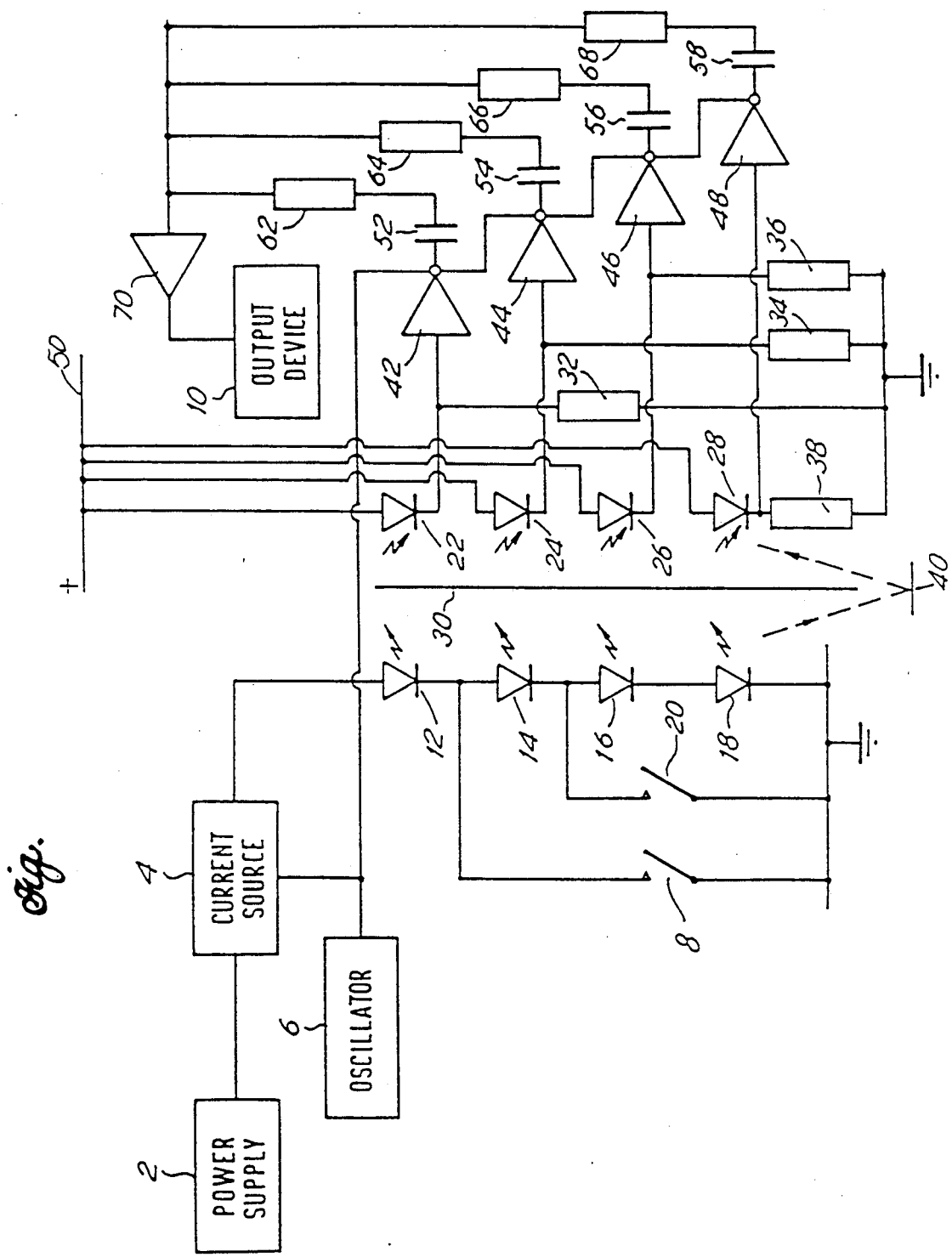

PHOTOELECTRIC ARRAY DETECTION CIRCUITRY WITH DUAL GATING MEANS

BACKGROUND OF THE INVENTION

1. FIELD OF THE INVENTION

The present invention relates to detection circuitry.

2. DESCRIPTION OF THE PRIOR ART

Detection circuitry is now used in a wide variety of applications. For example, lift or elevator doors are provided with detection circuitry to prevent the doors closing when the presence of an obstruction is sensed in the doorways.

In automatic hand driers, detection circuitry is used to sense the approach of hands to be dried and in response thereto activates the supply of hot air.

In automatic toilets, detection circuitry is used to monitor the departure of a user from the toilet seat and, after a determined delay, the circuitry activates a flushing mechanism. The same circuitry may be used to initiate a ventilator fan in response to the approach of a user to the toilet seat.

Such circuitry may incorporate infrared transmitters and detectors. The transmitters and detectors are advantageously semiconductor transmitters and detectors, but are preferably in the form of diodes for inexpensive of manufacture.

When such diodes are used as detectors, they are generally connected in series with a resistor across a pair of power supply rails. These diodes are positioned to receive light, either directly or by reflection from a light emitting diode.

The environment in which such diodes are required to operate quite often means that the detecting diodes are subject to sunlight, which is many times more powerful than the light output of the light emitting diode. Therefore, in order to prevent the diode from saturating, the value of the series connected resistor needs to be relatively low (for example 200 ohmns). As a result, the variation in output signal level from the detector diode is relatively low, and the signal-to-noise ratio is also low.

This means in practice that the detection circuitry is generally limited to applications where the range over which detection is required is relatively low.

British patent specification 1,524,564 describes a light curtain apparatus for detecting the presence of an object in a detection zone.

A row of light generators face a row of light receptors to provide a row of beams traversing the area to be monitored.

Each light generator is energized in succession, and each light receptor is enabled in synchronism with its corresponding light generator so that only one light generator and one light receptor are active at any one time.

Thus, at any one time only one light receptor and one light generator are active.

The specification does mention in passing that two or more light receptors can correspond to one light generator and that a single light receptor can correspond to two or more light generators, but there is no disclosure as to how these are connected in a circuit.

The present invention is advantageous over the prior art in that it provides an array of light receptors and generators which are connected in a circuit so that their effects are cumulative and so that the effect of environmental lighting is substantially eliminated.

It is an object of the invention to provide an improved detection circuitry.

SUMMARY OF THE INVENTION

According to the present invention, there is provided detection circuitry comprising, including a transmitter array having at least one light emitting element, a receiver array having at least one light detecting element, a device controlling the light emitting and detecting elements so that they transmit and receive light in synchronism and to effect a combining operation so that the output signal from the detector array is increased by a factor substantially equal to the product of m and n, over the case where only one light emitting element and one light receiving element are used, wherein m is equal to the number of light emitting elements and n is equal to the number of light detecting elements and wherein both m and n are whole numbers and at least one is greater than unity.

According to the present invention, there is provided detection circuitry comprising light transmitting means, and a plurality of light receiving means, each said light receiving means comprising a photodetector connected in series with resistance means, synchronization means for synchronizing the actuation of the light receiving means with the output of the light transmitting means and summing means for summing the outputs at junctions between each photodetector and its corresponding resistance means.

BRIEF DESCRIPTION OF THE DRAWINGS

Detection circuitry embodying the invention will now be described, by way of example, with reference to the accompanying diagrammatic drawing which is a circuit diagram of the circuitry.

DESCRIPTION OF THE PREFERRED EMBODIMENTS

The detection circuitry shown in the sole FIGURE is arranged to be incorporated into a hand drier, for example, to automatically energize a fan and a heater when the presence of a hand is sensed in the vicinity of the output of the drier. The fan and heater are represented in the drawing by an output device 10. The presence of a hand is sensed by an array of transmitters cooperating with an array of receivers.

The array of receivers are advantageously shielded from direct line of sight with the transmitters, but respond to light from the transmitters when reflected from the hand when present. Instead, the transmitter and receiver arrays may be positioned in direct line of sight with each other and arranged to respond when the light is interrupted by the presence of a hand.

As shown in more detail, the circuitry includes a power supply 2 feeding a current source 4. The current source 4 is gated by the output signals from an oscillator 6 which may, for example, be in square wave form having a mark space ratio of 1:10 and a frequency of 2 kHz. The frequency of 2 kHz is selected in order that the subsequent receiving circuits can filter out the dc content of sunlight and the AC content of artificial light (fluorescent lights operating at 50 or 60 Hz).

The current source 4 in turn feeds the series combination of four light emitting diodes 12, 14, 16 and 18. A switch 20 is connected in parallel with two series-connected diodes 16 and 18 so as to shunt these diodes out of circuit when not required. A switch 8 is connected in parallel with the three series-connected diodes 14, 16 and 18 so as to shunt these diodes out of circuit when not required. The four diodes 12 to 18 define a transmitter array.

A receiver array includes four photodiodes 22, 24, 26 and 28. Each photodiode 22 to 28 is connected in series with a respective one of four resistors 32, 34, 36 and 38, and the four series combinations are connected in parallel between a positive supply rail 50 and earth.

The signal appearing at the junction between the diode 22 and the resistor 32 is buffer switched by a buffer gating amplifier 42 fed through a capacitor 52 forming a dc filter and 50–60 Hz AC filter through a resistor 62 to a summing amplifier 70.

Similarly, the signals appearing at the junctions between diodes 24 to 28 and corresponding capacitors 34 to 38 are buffer switched by respective buffer gating amplifiers 44 to 48, filtered by respective capacitors 54 to 58 and fed to the common summing amplifier through respective resistors 64 to 68.

The output signal from the summing amplifier 70 is fed to control the output device 10.

A shield 30 is provided between the transmitter, and receiver arrays and a reflective surface 40 (such as a hand) is shown below the shield by means of which light from the transmitter array may be directed at the receiver array.

The output of each buffer gating amplifier 42 to 48 is connected to the oscillator so that the buffer gated amplifiers 42 to 48 are synchronously gated with the light transmitted by the transmitter diode array.

The resistors 32 to 38 may be variable resistors and are selected to provide a matched impedance to their respective diodes.

In particular, when the diodes 22 to 28 are likely to be subjected to sunlight (direct or indirect), the values of the resistors are selected so that the diodes do not saturate and so maintain their sensitivity to light from the transmitter array.

By using four light emitting diodes on the transmitter array, the sensitivity of each diode 22 to 28 is effectively increased by a factor of four. This means that the detection range can be extended without loss of sensitivity over the case when only one transmitting diode is used.

Furthermore, by using four photodiodes each in an independant circuit, and by AC decoupling and then combining the four outputs in a summing amplifier, the magnitude of the output signal is increased by a factor of four without significantly increasing the noise level, (noise being random tends to be averaged in the summing amplifier rather than cumulative as with the detected signal). Also, the effects of saturation are avoided since the amplified output signal is never allowed to approach the level of the voltage on the positive rail 50.

As a consequence, the signal-to-noise ratio is improved.

The detection circuitry described is a multipurpose circuit which can be readily adapted to cope with the different detection range requirements in different environments. To reduce the range of operations, the switches 20 and 8 may be progressively closed. Instead, or in addition, the outputs from the amplifiers may be selectively inhibited by connections or circuitry (not shown). Of course, the number of light emitting diodes and photodiodes can be increased or decreased at will.

It is a generalization that the output signal S from the summing amplifier is a function of the number n of photodiodes in circuit and the number m of light emitting diodes in circuit ie, $$S = f(m \cdot n)$$

where at least either m or n is a whole number greater than one.

This is a significant advantage over the prior art where, in order to increase the value of S and to avoid saturation by sunlight, more expensive components (photo transistors for example) and more expensive amplifiers need to be used (in order to avoid a low signal-to-noise ratio). The additional cost of such components usually far exceeds the cost of the increased member of inexpensive components used in the present embodiment.

Furthermore, with the present embodiment the effective operating range of the detector can be increased virtually ad infinitum—something which is not possible with the prior art arrangement.

The embodiment of the present invention thus provides an unexpected result that by using arrays of inexpensive components and summing their effects, better results can be achieved than by using more expensive traditional arrangements where sensitivity is usually finite.

The light transmitted and received is preferably in the infrared range.

While a presently preferred embodiment of the present invention has been illustrated and described, modifications and variations thereof will be apparent to those skilled in the art given the teachings herein, and it is intended that all such modifications and variations be encompassed within the scope of the appended claims.

I claim:

1. Detection circuitry comprising
   a transmitter array having n light emitting elements where n is a whole number equal to or in excess of unity;
   a receiver array having m light receiving elements where m is a whole number equal to or in excess of unity, and where at least one of m and n is greater than unity;
   a power source for energizing the transmitter and receiver arrays;
   first gating means for gating the power from the power source to the transmitter array;
   second gating means for gating outputs of the receiver array;
   synchronization means operating at a predetermined frequency for operating said first and second gating means simultaneously; and
   summing means for summing outputs of said second gating means to provide an output signal which is the product of n and m greater than the output signal generated if both n and m were unity.

2. Detection circuitry according to claim 1 including means for selectively varying at least m or n.

3. Detection circuitry according to claim 1 wherein each said emitting element comprises a light emitting diode and wherein each said detecting element comprises a photodiode.

4. Detection circuitry comprising
   light transmitting means;
   a plurality of discreet light receiving means, each said light receiving means comprising
   a photodetector, and resistance means connected in series with the photodetector to define a junction therewith;

gating means, for gating the outputs at the junctions between each photodetector and its corresponding resistance means;

synchronization means operating at a predetermined frequency connected to simultaneously actuate the light receiving means and all the gating means; and summing means for summing the outputs of the gating means.

5. Detection circuitry according to claim 4 including filter means connected between each gating means and the summing means for filtering out the DC component and the low frequency AC component in the output at each said junction before application to said summing means.

6. Detection circuitry according to claim 4 including amplifying means connected between each said junction and said summing means.

7. Detection means according to claim 4 wherein said light transmitting means comprises
   a plurality of light emitting elements
   circuit means connecting said light emitting elements in series and
   a current source connected to said circuit means to energize said light emitting elements.

8. Detection circuitry according to claim 7 wherein said synchronization means comprises an oscillator connected to gate said current source and to said gating means.

9. Detection circuitry according to claim 7 including switching means for switching said light emitting elements selectively into and out of said circuit series.

10. Detection circuitry according to claim 4 wherein said light transmitting means comprises light emitting diodes and wherein said light receiving means includes photodiodes.

11. Detection circuitry according to claim 4 wherein the light transmitted and received lies in the infrared range.

12. Detection circuitry for controlling operation of an external device, the circuitry comprising:
   transmitter means for emitting light at an area;
   receiver means for receiving light from the same area and providing an output based on received light; and
   means for synchronously energizing the transmitter means with generation of outputs by the receiver means,
   wherein the transmitter means comprises at least a first number of light emitting elements, and the receiver means comprises a second number of light receiving elements, the first and second numbers totaling at least three, and wherein the detection circuitry further comprises means for summing outputs of the transmitter means to provide an output for controlling operation of the external device, and the output of the means for summing is greater, by a factor corresponding to a product of the first and second numbers, than an output which would be generated if both the first number and the second number were one.

* * * * *